(12) United States Patent
Gloceri et al.

(10) Patent No.: US 12,325,417 B2
(45) Date of Patent: Jun. 10, 2025

(54) SYSTEMS AND METHODS FOR ELECTRIC VEHICLE SPEED CONTROL

(71) Applicant: Rivian IP Holdings, LLC, Plymouth, MI (US)

(72) Inventors: Gary Joseph Gloceri, Waterford, MI (US); Paul Theodosis, Dublin, CA (US); Sabarish Gurusubramanian, Mountain View, CA (US); Thomas Hall, White Lake, MI (US); Nachiket Vader, Irvine, CA (US); Martin Hermez, Newport Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 468 days.

(21) Appl. No.: 17/443,525

(22) Filed: Jul. 27, 2021

(65) Prior Publication Data

US 2023/0034858 A1    Feb. 2, 2023

(51) Int. Cl.
*B60W 30/14* (2006.01)
*B60W 10/18* (2012.01)
(Continued)

(52) U.S. Cl.
CPC .......... *B60W 30/143* (2013.01); *B60W 10/18* (2013.01); *B60W 30/16* (2013.01);
(Continued)

(58) Field of Classification Search
CPC .... B60W 30/143; B60W 10/18; B60W 30/16; B60W 30/18127; B60W 40/06; B60W 40/1005; B60W 40/105; B60W 2554/804; B60W 2554/802; B60W 2520/105; B60W 2720/30
See application file for complete search history.

(56) References Cited

U.S. PATENT DOCUMENTS

| 6,122,588 A | 9/2000 | Shehan et al. |
| 2002/0099491 A1* | 7/2002 | Akabori ............. B60K 31/0008 180/170 |

(Continued)

FOREIGN PATENT DOCUMENTS

| CN | 105644560 A | 6/2016 |
| CN | 108528268 A | 9/2018 |
| CN | 111204228 A | 5/2020 |

OTHER PUBLICATIONS

Ahlawat et al. "Estimation of Road Load Parameters via On-road Vehicle Testing" from the Tire Technology Expo 2013 (Year: 2013).*

*Primary Examiner* — Wade Miles
*Assistant Examiner* — Joshua Alexander Garza
(74) *Attorney, Agent, or Firm* — Haley Guiliano LLP (57) ABSTRACT

Example methods and systems for controlling speeds of a vehicle may generally determine a target vehicle acceleration using an autonomy control module of the vehicle. The target vehicle acceleration may be determined based upon at least one of a target vehicle following distance, a target vehicle following speed, or a target vehicle speed. The determined vehicle acceleration may be mapped to a level of vehicle torque using a vehicle dynamics module of the vehicle. Additionally, the level of vehicle torque may be applied to one or more wheels of the vehicle.

19 Claims, 5 Drawing Sheets

(51) Int. Cl.
*B60W 30/16* (2020.01)
*B60W 30/18* (2012.01)
*B60W 40/06* (2012.01)
*B60W 40/10* (2012.01)
*B60W 40/105* (2012.01)

(52) U.S. Cl.
CPC ...... *B60W 30/18127* (2013.01); *B60W 40/06* (2013.01); *B60W 40/1005* (2013.01); *B60W 40/105* (2013.01); *B60W 2520/105* (2013.01); *B60W 2554/802* (2020.02); *B60W 2554/804* (2020.02); *B60W 2720/30* (2013.01)

(56) References Cited

U.S. PATENT DOCUMENTS

| | | | |
|---|---|---|---|
| 2002/0107106 A1* | 8/2002 | Kato | F02D 31/001 |
| | | | 477/181 |
| 2018/0186374 A1* | 7/2018 | Ando | B60W 40/107 |
| 2018/0251118 A1* | 9/2018 | Gaither | B60L 7/10 |
| 2018/0274673 A1* | 9/2018 | Sugai | F16H 61/0248 |
| 2019/0217861 A1* | 7/2019 | Kurahashi | B60W 30/18163 |
| 2019/0263403 A1* | 8/2019 | Choi | B60W 30/146 |
| 2020/0171962 A1* | 6/2020 | Han | B60W 10/08 |
| 2020/0180602 A1* | 6/2020 | Jeong | B60W 10/06 |
| 2022/0032929 A1* | 2/2022 | Wang | B60W 60/0015 |

\* cited by examiner

SYSTEMS AND METHODS FOR ELECTRIC VEHICLE SPEED CONTROL

INTRODUCTION

The present disclosure is directed towards speed control for a vehicle, and more particularly towards improved speed control in an adaptive cruise control system of a vehicle.

SUMMARY

Example approaches disclosed herein methods for controlling speeds of a vehicle. In one example approach, a method includes determining a desired vehicle acceleration, using an autonomy control module of the vehicle based upon at least one of a target vehicle following distance, a target vehicle following speed, or a target vehicle speed. The method further includes mapping the determined vehicle acceleration to a vehicle torque request including a level of vehicle torque using a vehicle dynamics module of the vehicle, and applying the vehicle torque request to generate the level of vehicle torque to one or more wheels of the vehicle.

In at least some example approaches, a speed control system for controlling speed of a vehicle, includes an autonomy control processing circuitry module of the vehicle configured to determine a target vehicle acceleration based upon at least one of a target vehicle following distance, a target vehicle following speed, or a target vehicle speed. The system further includes a vehicle dynamics processing circuitry module of the vehicle. The vehicle dynamics processing circuitry module is configured to receive or detect the target vehicle acceleration, map the determined vehicle acceleration to a vehicle torque request including a level of vehicle toque, and output the vehicle torque request to be applied or generating the level of torque to one or more wheels of the vehicle.

In some example approaches, a modular autonomy control module is provided for use in one or more types of vehicles. The modular autonomy control module is configured to receive or detect one or more sensor inputs, determine at least one of a target vehicle following distance, a target vehicle following speed, or a target vehicle speed, and determine a target vehicle acceleration based on the at least one of the target vehicle following distance, a target vehicle following speed, or the target vehicle speed. The modular autonomy control module is further configured to output the target vehicle acceleration to a vehicle dynamics module of one of the multiple different types of vehicles. The vehicle dynamics module is tailored or configured to the vehicle type to convert the desired vehicle acceleration to a corresponding torque input to achieve the target desired vehicle acceleration, and the modular autonomy control module need not be tailored to the vehicle type.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

The present disclosure is generally directed to vehicles and systems thereof for implementing adaptive cruise control (ACC) or autonomous control of a vehicle. Typically, control systems for vehicle speed such as adaptive cruise or autonomous vehicles require calibration to a given vehicle architecture, and must account for vehicle-specific factors such as vehicle weight, size, engine or motor power, etc. As a result, speed control systems are generally vehicle-specific, and require different calibrations or even control methodologies across vehicle lines. This may be a particular challenge in advanced levels of vehicle autonomy, e.g., Level 2-5 autonomy, where it is desirable for the vehicle to replicate human driver dynamics. Accordingly, example illustrations herein are generally directed to methods and systems for vehicles that facilitate speed control and reduce the need for intensive vehicle-specific calibration. More specifically, a modular approach to a vehicle speed control system may allow at least some modules of the system to be configured for a broad range of vehicle architectures or classes.

In some examples, a modular autonomy control module may be broadly applied to various vehicle types or configurations without requiring calibration or vehicle-specific parameters. By contrast, a vehicle dynamics module in communication with the autonomy control module may be tailored or calibrated to a type, configuration, chassis, frame, weight, etc. of a specific vehicle into which the vehicle dynamics module is installed. The modular autonomy control module may be configured to determine a target or desired vehicle acceleration based on a following distance, e.g., a distance between the vehicle and one or more other vehicles, a following speed, e.g., a relative speed between the vehicle and one or more other vehicles, and/or a target or desired vehicle speed associated with the operation of the speed control system. The modular autonomy control module is further configured to output the target vehicle acceleration to a vehicle dynamics module, which maps the target acceleration to a torque request indicating a magnitude or level of vehicle torque, thereby generating the level of vehicle torque to control speed of the vehicle. Accordingly, in example approaches the vehicle dynamics module is generally tailored or calibrated with respect to a specific vehicle type, while the modular autonomy control module need not be tailored to the vehicle type, and therefore may be broadly applicable to other vehicles or types of vehicles.

In addition, possibly in contrast to or to supplement examples herein, some previous approaches employ speed control in an electric vehicle using vehicle speed. For example, a vehicle may adjust power output of a motor or engine based upon deviation of the actual vehicle speed from a vehicle set speed. In contrast, example approaches herein initially determine a target/desired acceleration and map the target/desired acceleration to torque commands for wheel(s) of the vehicle.

In examples of modular speed control for a vehicle that follow, an autonomy control module and vehicle dynamics module may provide adaptive cruise control (ACC) or autonomous control of a vehicle by way of torque requests or commands. Additional modules may be provided, such as an Electronic Stability Program (ESP) or brake system module that controls hydraulic braking pressure of mechanical/hydraulic wheel brakes. The vehicle dynamics module and brake system/ESP modules may thereby decelerate the vehicle without direct driver intervention, such as during ACC driving or when the vehicle is under some aspect of autonomous control. As used herein, autonomous control includes control of at least vehicle speed (e.g., to slow down to avoid obstacles, or gain speed to a desired/set speed) or direction (e.g., to steer around other vehicles, turns, etc.), or both, without requiring driver intervention.

The different modules, e.g., the autonomy control module and vehicle dynamics module, may be separable physically or otherwise to facilitate use of the autonomy control module in multiple different vehicles. Merely by way of example, the autonomy control module and vehicle dynamics module may be provided, programmed, and/or executed on the same physical processor or separate physical processors or memories associated with a vehicle. In another example, the autonomy control module and vehicle dynamics module are stored as separate software modules on a single processor or memory.

Examples herein are generally directed to a battery electric vehicle (e.g., car, truck, sport utility vehicle, minivan, full size van, and/or delivery van, among others), although they may be applied in the context of any vehicle or powertrain system for a vehicle such as gas, hybrid, diesel, etc. Nevertheless, certain problems have been known to arise in battery-electric vehicles (i.e., where the vehicle relies upon electrical energy stored at the vehicle as a source of motive power applied via one or more electric motors) in the context of a speed control system. More specifically, when an energy storage system of the electric vehicle is at a high state of charge, the energy storage system may have difficulty absorbing charge generates by regenerative braking that is applied via motors of the vehicle. Deceleration of an electric vehicle can be achieved through three mechanisms: coasting (i.e., a zero-acceleration request from a propulsion system or controller), regenerative braking via the motor(s), and/or mechanical braking applied via one or more wheel brakes of the vehicle. Generally, when the energy storage is above a specified high state of charge, the energy storage system does not have the capacity to absorb energy from the propulsion system during regenerative braking. As a result, if the energy storage system is above a specified state of charge when a deceleration is requested by the ACC system, the electric propulsion system cannot utilize regenerative braking to decelerate the vehicle. Some example illustrations herein therefore may also use inputs of system limitations, e.g., limits of regenerative braking, to apportion torque controls appropriately to different vehicle devices for decelerating a vehicle via application of torque.

Figure 1:
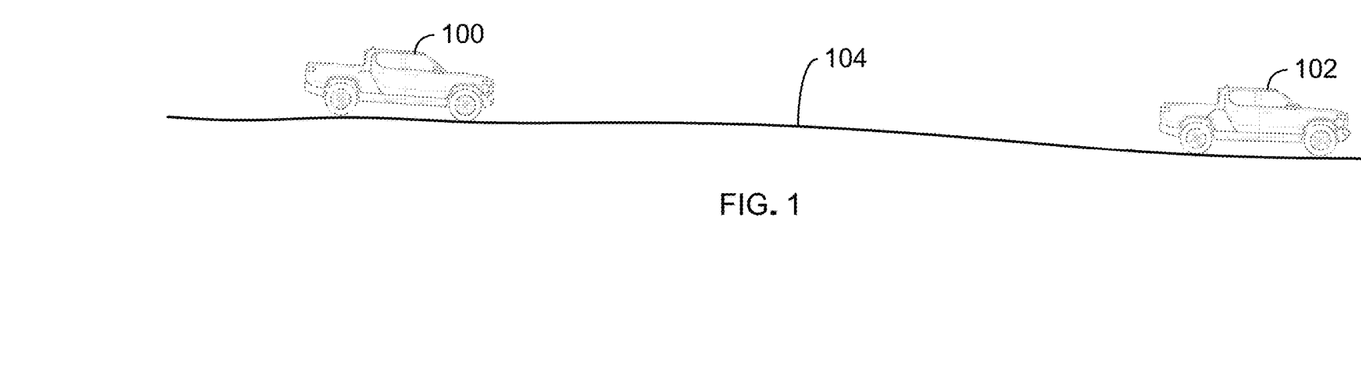
FIG. 1 shows a schematic view of an illustrative vehicle having a speed control system, in accordance with some embodiments of the present disclosure.

Referring now to FIG. 1, an illustrative vehicle 100 is shown following a second vehicle 102 as both are traveling in a same direction along a road surface 104. The road surface 104 may be a road, highway, trail, or any other surface. The vehicle 100 may employ aspects of ACC or autonomous driving as noted above. Accordingly, the vehicle 100 may include any sensors or imaging devices that may be convenient to detect objects, vehicles, and the like in the vicinity of the vehicle 100. Merely by way of example, the vehicle 100 may include radar, cameras, ultrasonic sensors to determine a presence of obstacles, vehicles, edges of a road, mapping, or the like.

The vehicle 100 may initially be provided a set speed, e.g., by a vehicle operator or driver. The vehicle 100 may control vehicle speed as necessary to avoid obstacles of other vehicles on the road surface 104, e.g., vehicle 102. For example, the vehicle 100 may detect a presence of the vehicle 102 as the vehicle 100, travelling at a higher initial speed than the vehicle 102, approaches the vehicle 102. The ACC or autonomous control of the vehicle 100 may slow the vehicle, e.g., by coasting, causing regenerative braking via one or more electric motors of the vehicle, and/or applying mechanical brakes to one or more wheels of the vehicle. Accordingly, the vehicle 100 may automatically slow to maintain a desired following distance behind the vehicle 102, or to maintain a desired following speed relative to the vehicle 102.

In another example, vehicle 100 may control speed in response to characteristics of the road surface 104. For example, as illustrated the surface 104 may be a downgrade, such that the vehicle 100 may begin to exceed a desired set speed as the vehicle 100 travels along the surface 104, i.e., due to gravity. Accordingly, the vehicle 100 may reduce speed by implementing coasting, regenerative braking, and/or mechanical brakes of the vehicle 100.

In other examples, the vehicle 100 may gain speed during autonomous control. For example, the vehicle 102 may increase speed, increasing a distance between the vehicle 102 and vehicle 100 beyond a desired following distance. Accordingly, the vehicle 100 may automatically increase speed, e.g., to a desired set speed, speed limit, or until the vehicle 100 reaches a desired following distance behind the vehicle 102, or until the vehicle 100 reaches a desired following speed relative to the vehicle 102.

Figure 2:
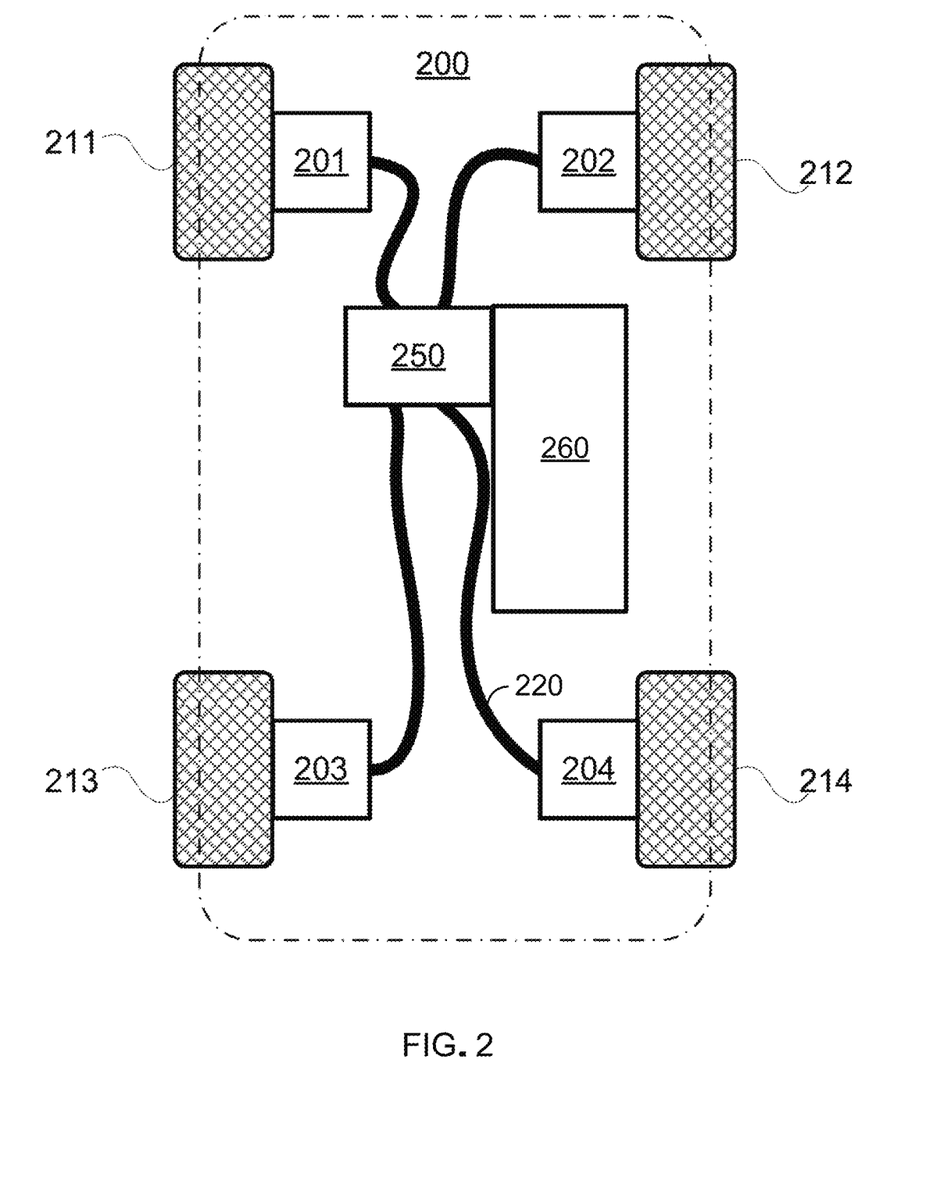
FIG. 2 shows a system diagram of an illustrative vehicle having multiple motors, in accordance with some embodiments of the present disclosure.

FIG. 2 shows a system diagram of an illustrative vehicle 200 having multiple motors, in accordance with some embodiments of the present disclosure. To illustrate, vehicle 200 may be the same as vehicle 100 of FIG. 1. For purposes of illustration, vehicle 200 is a four-wheeled vehicle having one motor for each wheel. The level of torque applied by each of the one or more assemblies may be determined and generated based on the embodiments described herein. For example, motor assemblies 201, 202 may generate a first level torque clockwise and motor assemblies 203, 204 may genera a second level of torque counterclockwise. More specifically, motor assemblies 201, 202, 203, and 204 may each include an electric motor, a gearbox (e.g., a reduction gearset or pulley set), a shaft coupling (e.g., to one of wheels 211-214, as illustrated), auxiliary systems (e.g., a lubricating oil system, a cooling system, a power electronics system), any other suitable components, or any combination thereof. As illustrated, each of motor assemblies 201-204 is coupled to control system 250 via couplings 220, which may include power leads, control wires, sensor wires, communications buses, any other suitable coupling types, or any combination thereof. Control system 250 is illustrated being coupled to a battery pack 260, although in some examples the control system 250 may incorporate one or more battery packs or otherwise be configured to provide electrical power (e.g., current) to electric motors of motor assemblies 201-204.

Control system 250 may be configured to generate torque commands for each of motor assemblies 201-204, where the commands may indicate one or more levels of vehicle torque, and where each level of vehicle torque may indicate a level of torque for each of the motor assemblies 201-204. In some embodiments, control system 250 generates control signals for each of motor assemblies 201-204. The control signals may include messages, current values, pulse width modulation (PWM) values, any other suitable values, any other information indicative of a desired operation, or any combination thereof. For example, control system 250 may include a speed controller (e.g., a proportional-integral-derivative (PID) feedback controller), a torque controller, a current controller (e.g., per motor phase of each motor), a position controller, any other suitable controllers, or any combination thereof. Moreover, control system 250 may include adaptive cruise control, semi-autonomous control, or fully autonomous control capabilities such as described above with respect to the vehicle 200 and components thereof, e.g., the motor assemblies 201-204, vehicle steering, etc.

Figure 3:
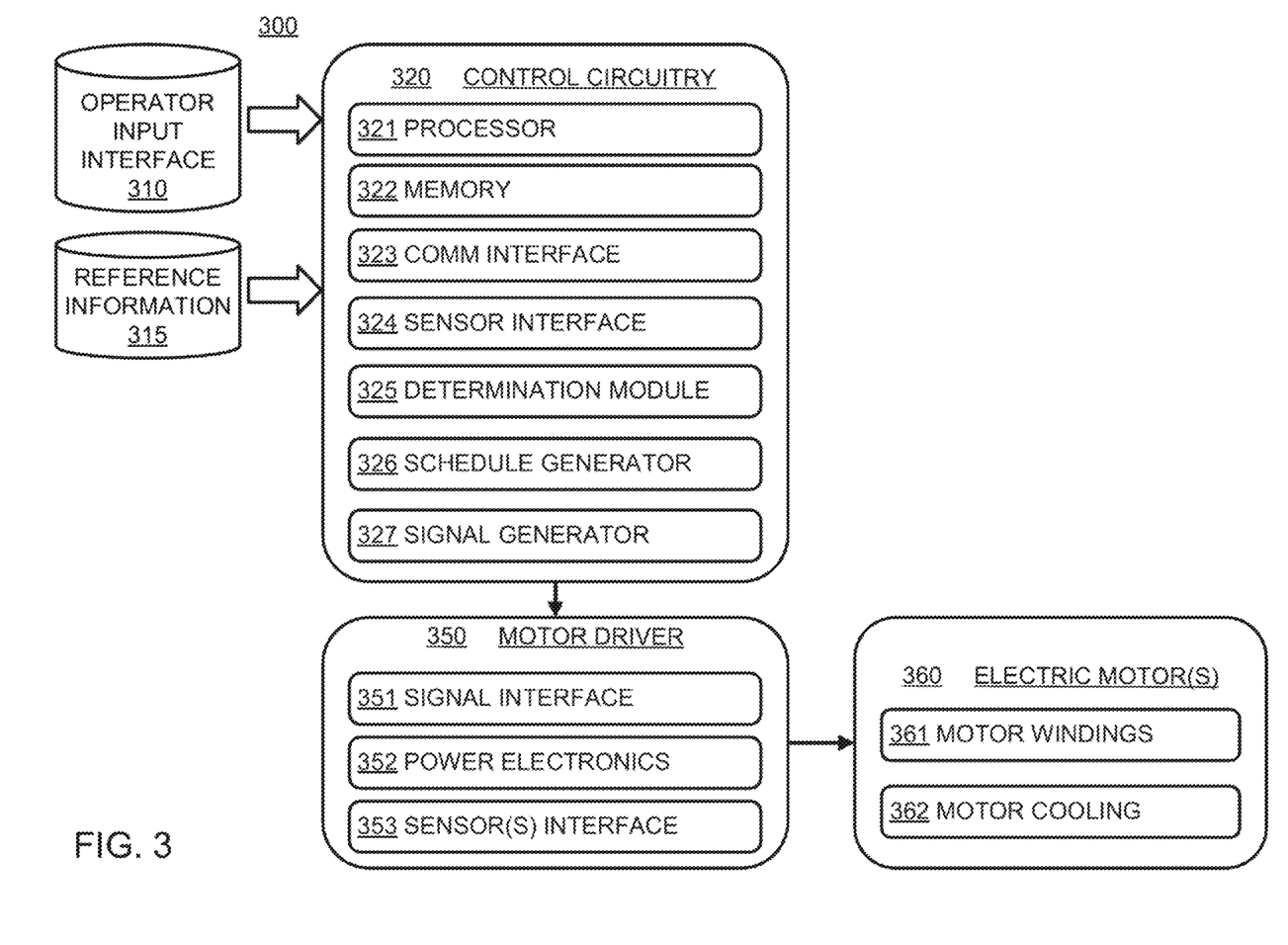
FIG. 3 shows a system diagram for an illustrative system for managing wheel torque, in accordance with some embodiments of the present disclosure.

Turning now to FIG. 3, a system diagram for illustrative system 300 for managing wheel torque, in accordance with some embodiments of the present disclosure. To illustrate, system 300 may be implemented as control system 250 of FIG. 2, or a part thereof, for controlling electric motors of a vehicle (e.g., vehicle 100 of FIG. 1 or vehicle 200 of FIG. 2). As illustrated, system 300 includes control circuitry 320, operator input interface 310, reference information 315, motor driver 350, and electric motor(s) 360.

Control circuitry 320, as illustrated, includes processor 321, memory 322, communications (COMM) interface 323, sensor interface 324, determination module 325, schedule generator 326, and signal generator 327. Processor 321 may include any suitable processing equipment such as a central processing unit having single core or dual core, bus, logic circuitry, integrated circuitry, digital signal processor, graphics processor, any other suitable components for reading and executing computer instructions, or any combination thereof. Memory 322 may include any suitable storage device such as, for example, volatile memory, non-volatile memory, a removable storage device, a solid state storage device, an optical device, a magnetic device, any other suitable component for storing and recalling information, or any combination thereof. COMM interface 323 may include electrical terminals, level shifters, a communications module, connectors, cables, antennas, any other suitable components for transmitting and receiving information, or any combination thereof. For example, COMM interface 323 may include an ethernet interface, a Wi-Fi interface, an optical interface, any other suitable wired or wireless interface, or any combination thereof. Sensor interface 324 may include a power supply, analog-to-digital converter, digital-to-analog converter, signal processing equipment, signal conditioning equipment, connectors, electrical terminals, any other suitable components for managing signals to and from a sensor, or any combination thereof. For example, sensor interface 324 may be configured to communicate with a current sensor, a position sensor (e.g., a rotary encoder coupled to the motor shaft or gear shaft), a temperature sensor, a voltage sensor, an accelerometer (e.g., a vibration sensor), any other suitable sensor, or any combination thereof. Determination modules 325 is configured to determine whether to modify a torque command or apply a constant torque command. Schedule generator 326 may be implemented in hardware, software, or a combination thereof to generate torque schedules as sequences of values (e.g., if determination module 325 determines to generate a non-constant or otherwise modified torque schedule). Signal generator 327 is configured to transmit a control signal indicative of the torque schedule generated by schedule generator 326 to motor driver 350, a motor controller, any other suitable processing equipment or communications interface, or any combination thereof. For example, signal generator 327 may convert values of the torque schedule to voltages, bits, messages, or any other suitable data for transmitting to a receiver (e.g., of signal interface 351). Signal generator 327 may generate, for example, an electrical signal, an electromagnetic signal (e.g., via photons of any suitable wavelength including radio, visible, or infrared), any other suitable signal, or any combination thereof.

Reference information 315 may include any information that is convenient for the vehicle 300. Merely by way of example, reference information 315 may include information relating to determining a desired acceleration for a vehicle, or an acceleration-torque mapping, for example as described in further detail below. Additionally, the reference information 315 may include a reference operating range, torque limits, temperature limits, equipment information, operator information, threshold or limit values, baseline torque schedules, torque command modifications (e.g., modulations), torque functions (e.g., or parameters thereof), any other suitable reference information, or any combination thereof.

Motor driver 350, as illustrated, includes signal interface 351, power electronics 352, and sensor(s) interface 353. Signal interface 351 is configured to receive control signals from control circuitry 320. For example, signal interface 351 may include electrical terminals, an amplifier, a filter, a signal conditioner, a level shifter, an analog to digital converter, an antenna, a cable, any other suitable hardware or software components, or any combination thereof. For example, the control signal may include a PWM signal, a pulse density modulated (PDM) signal, an analog signal, a square wave, a modulated carrier signal, any other suitable signal, or any combination thereof. In a further example, the control signal may be transmitted using a wired interface, wireless interface, optical interface, any other suitable interface, or any combination thereof. Power electronics 352 may include IGBTs, MOSFETs, switches, diodes, any other suitable components, or any combination thereof. For example, in some embodiments, power electronics 352 includes one or more H-bridge circuits (e.g., arranged electrically between DC buses) or half-bridge circuits (e.g., with a delta wye or star neutral connection). Sensor(s) interface 353 may include one or more sensors, a power supply, an interface for receiving and processing sensor signals, any other suitable components, or any combination thereof. For example, sensor(s) interface 353 may include current sensors (e.g., DC bus current, motor phase current), temperature sensors (e.g., indicative of a temperature of a switch or other current-carrying device), voltage sensors, speed sensors (e.g., coupled to one or more electric motors 360), any other suitable sensors for sensing any suitable parameter, or any combination thereof.

Electric motor(s) 360 includes one or more electric motors that each include motor windings 361 and optionally motor cooling 362. For example, in some embodiments, each of one or more electric motors 360 includes motor windings 361 that correspond to one or more phases of the respective motor. To illustrate, electric motor(s) 360 may include three-phase motors, four-phase motors, DC motors, switched reluctance motors, any other suitable motor having any suitable commutation, or any combination thereof. Motor cooling 362 may include, for example, a cooling jacket, a housing having passages for coolant, cooling fins, any other suitable components, or any combination thereof.

To illustrate, a cooling system having a pump and reservoir may be coupled to motor cooling 362 to maintain, reduce, or otherwise control a temperature of electric motor(s) 360.

In an illustrative example, a vehicle may include system 300, including control circuitry 320, motor driver 350, and electrical motor(s) 360. Reference information 315 may be included in memory 322 or may be retrieved from an external source via COMM interface 323 (e.g., via a wired or wireless interface). The vehicle may include a pedal, speed control buttons or other interfaces, or the like that serve as operator input interface 310, to provide an operator request. For example, an operator request may include a set speed or a target/desired vehicle speed.

Figure 4:
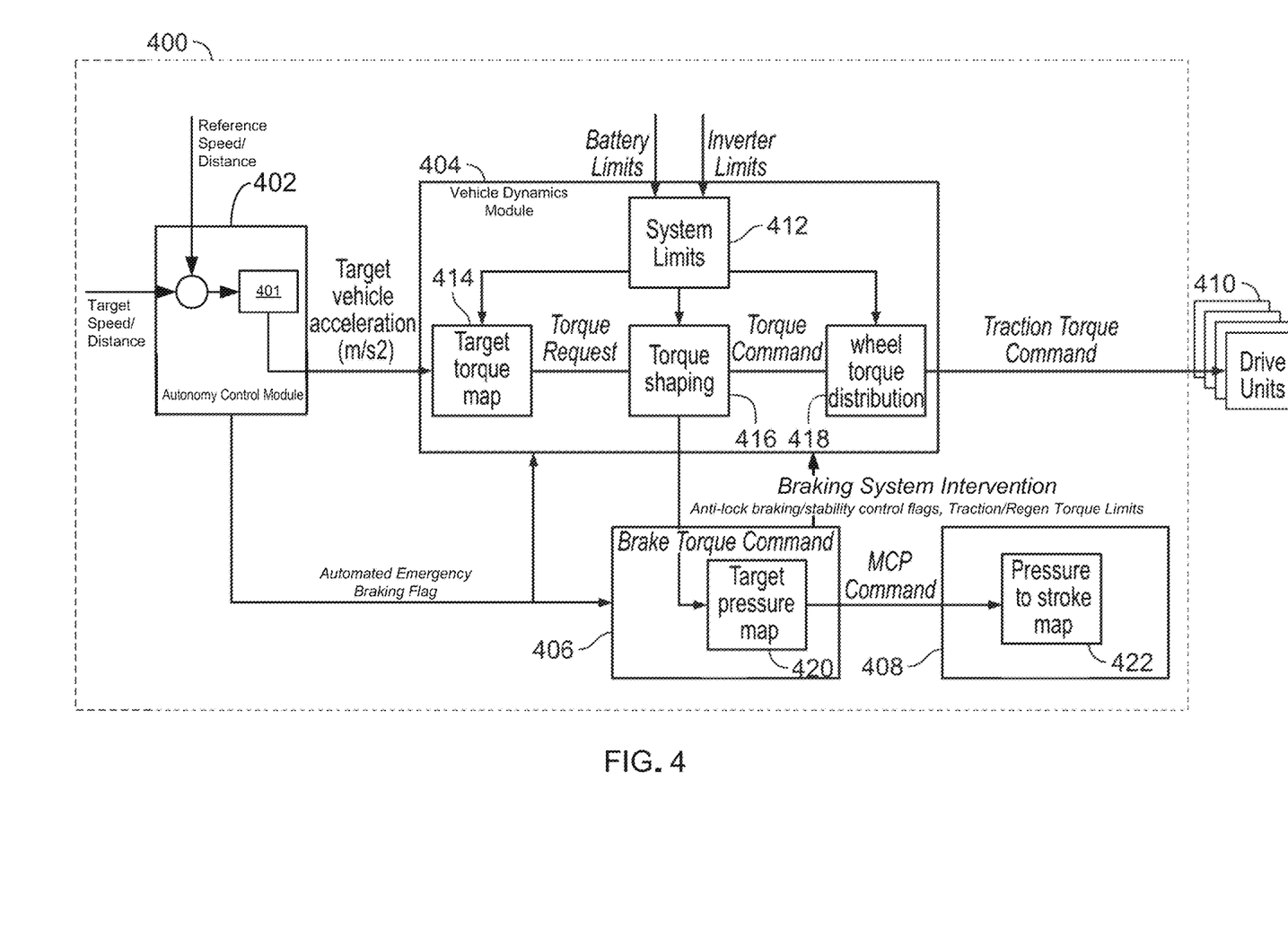
FIG. 4 shows a system diagram for an illustrative speed control system having an autonomy control module and a vehicle dynamics module, in accordance with some embodiments of the present disclosure.

Turning now to FIG. 4, an illustrative control circuitry 400 for controlling vehicle speed is illustrated. In an example, control circuitry may be implemented as control circuitry 320, or part thereof, for controlling electric motors of a vehicle (e.g., vehicle 100 of FIG. 1 or vehicle 200 of FIG. 2).

Control circuitry 400 may include a plurality of modules that are separable physically or via distinct software modules as described above, merely as examples. The control circuitry 400 includes an autonomy control module (ACM) 402 configured to determine a target acceleration for the vehicle, e.g., based upon a target or set speed, following distance to a vehicle, or distance to a detected obstacle. The set speed, following distance, obstacle detected, or the like may be determined based upon input(s) to the autonomy control module 402, e.g., from one or more vehicle speed sensors and/or sensors for detecting vehicles or obstacles such as radar, cameras, or the like, as discussed further below. For example, the autonomy control module 402 may include a speed controller 401 having a reference speed or distance and a target speed or distance as inputs, as illustrated in FIG. 4. A reference speed or distance may be a speed or distance as measured by sensor(s), e.g., of the vehicle 100. For example, the reference speed or distance may be a current speed of the vehicle 100, a distance to a vehicle 102 being followed, or a following speed with respect to vehicle 102. The target speed may be a set speed, following distance, or a following speed. The autonomy control module 402 may be in communication with a vehicle dynamics module (VDM) 404, which generally maps or converts target acceleration, which may be received as an input from the autonomy control module 402, to a torque request. The vehicle dynamics module 404 may provide torque commands as an output to drive units 410 of the vehicle. Drive units 410 of the vehicle may include electric motor drive units, e.g., motor driver 350 and/or motors 360 as described above.

A braking system of the vehicle may comprise one or more brake system modules. In the example illustrated in FIG. 4, a first brake system module 406 and a second brake system module 408 are provided. The first brake system module 406 may generally control application of braking torque to the vehicle. In an example, the first brake system module 406 is an electronic stability program (ESP) module, e.g., of the vehicle 100. A brake torque command generated by the vehicle dynamics module 404 may be received at the first brake system module 406 and converted to a master cylinder pressure (MCP) command using a target pressure map 420. The target pressure map 420 may thus determine a desired brake pressure from the brake torque command received from the vehicle dynamics module 404. The MCP command may be provided by the first brake system module 406 to the second brake system module 408, which in turn converts the MCP command to a master cylinder stroke using a pressure to stroke map 422. In an example, the second brake system module 408 is a brake booster control module, e.g., for an electromechanical brake booster of vehicle 100, or a brake master cylinder pressure (MCP) controller. The brake system, e.g., via the first brake system module 406, may provide interventions or flags to the vehicle dynamics module 404, e.g., as part of an electronic stability control function. For example, anti-lock braking or stability control flag(s) may be set, e.g., upon activation of anti-lock braking or stability control functions, which may be considered by the vehicle dynamics module 404 in developing torque commands or requests. In another example, traction torque or regenerative torque limits may be set by the first brake system module 406, which may intervene or limit torque requests or commands of the vehicle dynamics module 404.

The autonomy control module 402 may implement aspects of ACC or autonomous control of a vehicle, such as controlling vehicle speed autonomously. Merely as examples, autonomy control module 402 may slow vehicle 100 in response to a detection of another vehicle 102 being approaches by vehicle 100, or in response to vehicle 100 gaining speed due to a downgrade of the road surface 104. The autonomy control module 402 may be in communication with vehicle sensors providing input(s) to the autonomy control module 402, e.g., wheel speed sensors, radar, cameras, ultrasonic sensors, etc., with the autonomy control module 402 using these inputs to determine a need to alter vehicle speed, e.g., to accelerate or decelerate the vehicle in response to detected objects or vehicles. Autonomy control module 402 may also initiate emergency braking via an active emergency braking (AEB) flag that may be provided directly to first brake system module 406. For example, if autonomy control module 402 determines that an obstacle is close to the vehicle and emergency braking is warranted, AEB flag is sent to the first brake system module 406 to initiate immediate emergency braking. The AEB flag may also be provided to vehicle dynamics module 404, which may in response initiate any other appropriate action, e.g., application of additional negative torque via regenerative braking, etc.

The vehicle dynamics module 404 may generally convert a target acceleration, e.g., received from the autonomy control module 402, to a torque request. As illustrated in the example in FIG. 4, the vehicle dynamics module 404 includes a system limits module 412, a target torque map 414, a torque shaping module 416, and a wheel torque distribution module 418, each of which may be employed to generate appropriate torque commands for vehicle wheels and/or drive units.

Inputs to system limits module 412 may include a battery limit or an inverter limit. Battery limit information and/or inverter limit information may be received, e.g., from battery pack 260, thereby indicating limitations of the battery pack 260 that may affect torque requests generated by the vehicle dynamics module 404. For example, if battery pack 260 is at a relatively high state of charge that prevents or limits implementation of regenerative braking via the drive units 410, the system limit module 412 receives this information and may determine an applicable limit of the regenerative brake torque, as will be discussed further below.

Target torque map 414 may generally convert a target acceleration received from the autonomous control module 402 to a torque command for the wheels. In some cases, this may be a positive torque request that is applied to drive units 410, e.g., when the autonomous control module 402 determines that the vehicle should accelerate. In other cases, the torque request may be a negative torque, e.g., when the autonomous control module 402 determines that the vehicle should reduce speed or stop.

Torque shaping module 416 may be employed to direct torque commands to different vehicle components, e.g., to drive units 410 and/or mechanical brakes of vehicle wheel(s). In one illustrative example, vehicle 100 is proceeding along surface 104, and autonomous control module 402 determines that a negative acceleration is needed to counteract or reduce the extent to which the vehicle 100 gains speed due to gravity along the negative grade of the surface 104. Vehicle dynamics module 404 may use vehicle characteristics, e.g., vehicle weight, to determine a magnitude of negative regenerative braking torque that should be applied to achieve the target negative acceleration. Factors influencing determination of regenerative braking torque may be determined from vehicle sensors or systems. Merely as examples, a vehicle weight may be determined from air pressure(s) in one or more elements of an air suspension system of a vehicle, inasmuch as air pressures may be used to determine normal forces at each vehicle wheel/tire. A grade sensor of the vehicle, e.g., as may be provided in an air bag and/or stability controller of the vehicle, may determine a grade of a ground surface being traversed by the vehicle, and in some examples the vehicle may optimize an acceleration required by adding (i.e., if going downhill) or subtracting (i.e., if going uphill). Vehicle dynamics module 404 may also use a lookup table, e.g., of vehicle conditions, to determine an appropriate torque. In this example, vehicle dynamics module 404 may determine that a certain magnitude, e.g., 2500 Newton-meters (Nm), of negative braking torque is needed. The system limits module 412 indicates that a relatively lower magnitude of regenerative torque, e.g., 500 Nm, is available due to conditions of the battery pack 260, such as a relatively high charge state, or battery temperature. As a result, the vehicle dynamics module 404 determines that additional negative torque must be applied by the mechanical/hydraulic brakes of the vehicle to obtain the needed magnitude (i.e., 2500 Nm total) of negative torque. Accordingly, torque shaping module 416 may provide a brake torque command of 2000 Nm to the first brake system module 406. The torque shaping module 416 may also determine an application of torque over time, e.g., to ramp up or down application of torque, thereby preventing sudden acceleration/deceleration of the vehicle. Merely as one example, a relatively gradual change in torque may be employed, e.g., when a relevant following distance is relatively large, or the following speed or error is very small, and allowing that change to increase in magnitude as the distance decreases or the following speed increases.

As noted above, the autonomous control module 402 may determine a target acceleration that is used to develop torque commands. In at least some example approaches, a target acceleration may be determined based at least in part upon a vehicle speed. For example, a vehicle traveling at a relatively higher speed may require comparatively larger torque commands to increase or decrease acceleration, due to increased aerodynamic effects, road load, etc.

Figure 5:
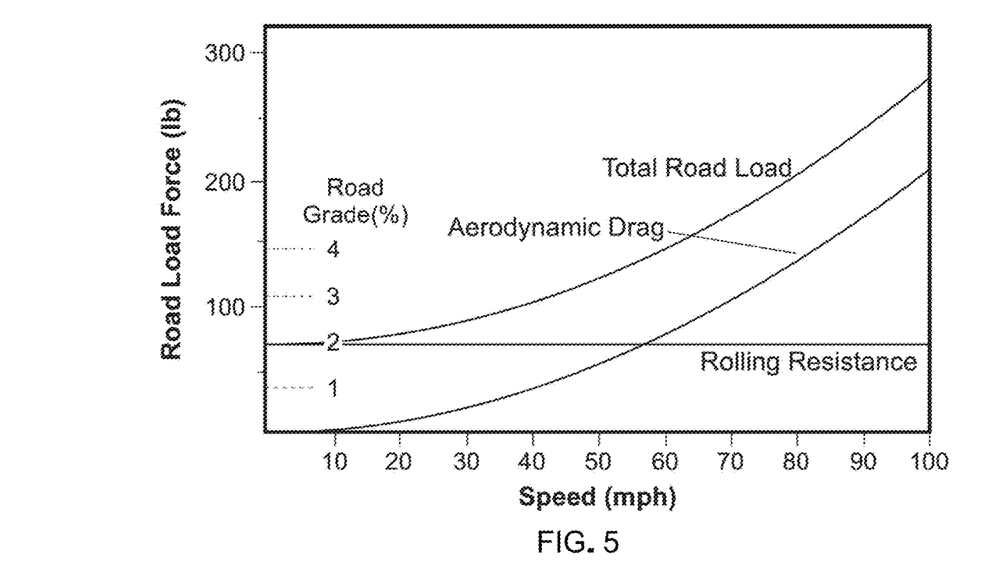
FIG. 5 shows a plot of road load force that may be employed in an illustrative process of determining a torque request from a desired vehicle acceleration, in accordance with some embodiments of the present disclosure.

Turning now to FIG. 5, an example method of determining a target vehicle acceleration or deceleration will be described in further detail. More specifically, FIG. 5 illustrates a plot of total road load versus vehicle speed. Factors considered may include, merely as examples, aerodynamic drag and rolling resistance. Some factors may influence road load as a constant, e.g., rolling resistance, and thus do not change as a function of vehicle speed. Other factors may influence road load as a constant multiplied by velocity or the square of velocity, such as aerodynamic resistance.

In the example illustrated in FIG. 5, target acceleration may be determined in part from a coast-down test to generate resistance acting on the vehicle as a function of vehicle speed. As an operating assumption, road load may be determined using vehicle speed from a plurality of factors which are summed together. It is generally not necessary to determine specific factors, e.g., aerodynamic drag, rolling resistance, mass, etc. for a specific vehicle. Rather, all factors related to vehicle speed (v) that affect road load of a vehicle may be resolved into an equation:

$$\text{Total Road load} = A + Bv + Cv^2 \quad (1)$$

Further, vehicle dynamics may be modeled as:

$$\text{Dynamic load} = M_v \cdot \frac{dv}{dt}; \quad (2)$$

where: A=rolling resistance
B=driveline losses
C=aerodynamic resistance; and
M=vehicle mass Accordingly, a coast-down test of a vehicle may generally determine factors A, B, C, and M in the foregoing equations, and calibration of the factors in advance is not required. In some examples, a rolling resistance value (A) is available based upon tire/wheel characteristics and thus known in advance, driveline losses (B) are a measured value or an added lump sum model, and aerodynamic resistance (C) is related to aerodynamic loss, which is a function of a coefficient of drag (Cd) and frontal area of the vehicle. Further, vehicle mass (M) or weight may be determined from vehicle sensors or systems, as described above. As a result, as noted above a modular autonomy control module, such as autonomy control module 402, can facilitate determining an appropriate acceleration and/or corresponding level of torque without vehicle-specific factors such as vehicle mass, rolling resistance, aerodynamic drag, configuration, and the like. Autonomy control module 402 may therefore be installed into vehicles having different characteristics without requiring calibration specific to the different characteristics. Merely by way of example, vehicles of a different rolling resistance, mass, aerodynamic drag, or vehicle type (e.g., sport-utility vehicle (SUV), pickup truck, wagon, sedan, etc.), may use a same autonomy control module 402 that is replicated and installed to each vehicle.

Figure 6:
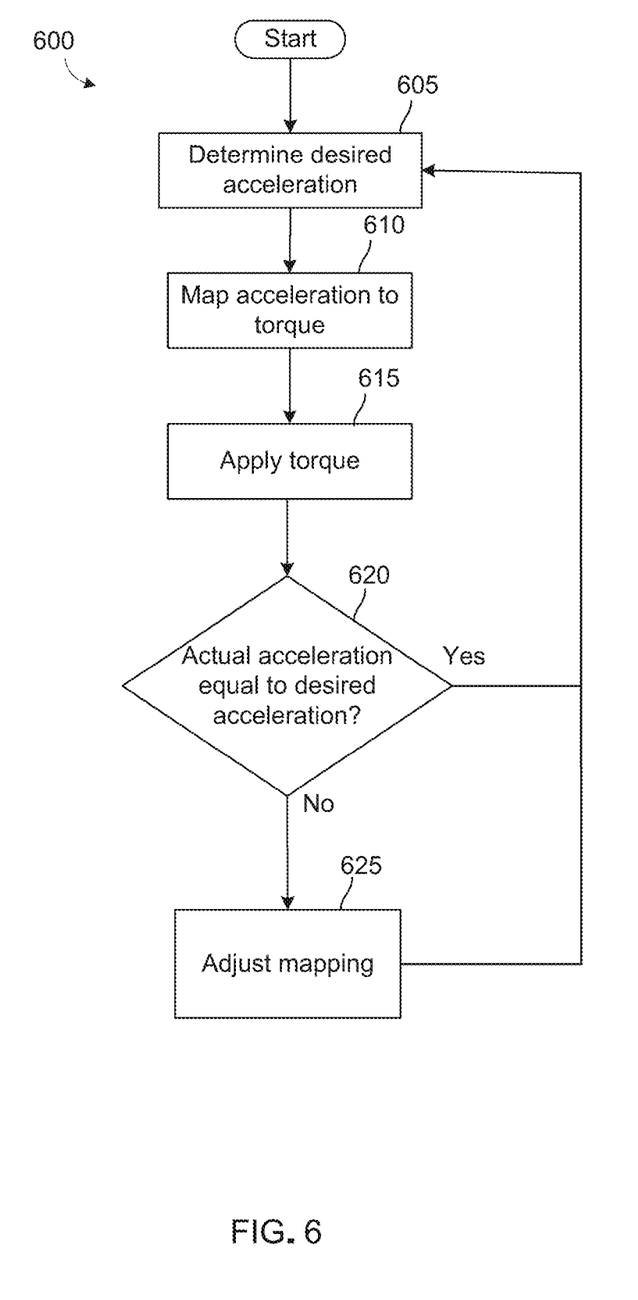
FIG. 6 shows a flowchart of an illustrative process for controlling speed of a vehicle, in accordance with some embodiments of the present disclosure.

Turning now to FIG. 6, a flowchart of an illustrative process 600 for controlling speed is described in further detail, in accordance with some embodiments of the present disclosure. To illustrate, in some embodiments, process 600 may be implemented using system 300 of FIG. 3, and/or control circuitry of FIG. 4.

Process 600 may begin at block 605, where a target vehicle acceleration may be determined. For example, as discussed above, autonomy control module 402 vehicle 100 may determine a target vehicle acceleration. The autonomous control module 402 may determine the target vehicle acceleration based upon at least one of a target vehicle following distance, a target vehicle following speed, or a target vehicle speed. In some example approaches, the autonomous control module 402 implements autonomous control of vehicle 100, e.g., by controlling one or both of vehicle speed and vehicle direction. The autonomous control module 402 may thus autonomously implement vehicle speed changes, e.g., causing the vehicle to slow down, stop, or accelerate. Further, the autonomous control module 402 may implement changes in vehicle direction, e.g., by steering the vehicle around curves in a road or around vehicles or obstacles.

Proceeding to block 610, the determined vehicle acceleration, i.e., of block 605 may be mapped to a vehicle torque request indicating a level of vehicle torque using a vehicle dynamics module of the vehicle. In some example approaches, the determined vehicle acceleration is mapped to a vehicle torque request indicating the level of vehicle torque based on vehicle speed. For instance, process 600 may include an instruction for determining one or more speeds of the vehicle, where the determined vehicle acceleration is mapped to the level of torque based on the one or more determined speeds of the vehicle. For example, as discussed above, a vehicle acceleration may be determined from a plurality of constants, each multiplied by a respective vehicle speed term to determine a plurality of products, as in equation (1) above. Accordingly, a target acceleration determined by adding the sum of the products may be mapped to a torque request. In this manner, the torque request is determined based upon vehicle speed. Process 600 may then proceed to block 615.

At block 615, the vehicle torque request may be applied to one or more wheels of the vehicle. For example, as discussed above applying the vehicle torque request may include providing positive torque commands to a drive unit, e.g., to accelerate the vehicle 100. In another example, negative torque commands may be implemented by regenerative braking of the vehicle using the drive units 410. In still another example, a negative torque request may be implemented by mechanical brakes of vehicle 100, e.g., to an extent regenerative braking of the vehicle is not sufficient to reduce vehicle speed adequately.

In some examples, it may be preferred to prioritize regenerative braking over mechanical/hydraulic braking applied by a wheel brake (e.g., disc brakes, drum brakes, or the like). Accordingly, in these examples torque shaping module 416 may generally employ regenerative braking via traction torque commands sent to the drive units 410 to the extent regenerative braking is available. The torque shaping module 416 may additionally send brake torque commands to target pressure map 420 of the first brake system module 406 if regenerative braking alone is insufficient to implement an entirety of a torque command. Accordingly, in some examples, torque shaping module 416 may compare a torque request received from target torque map 414 with a current regenerative torque capability of a battery system of the vehicle, e.g., battery pack 260. Where the vehicle torque request is determined to be less than a current regenerative torque capability, the vehicle torque request may be applied with regenerative torque (only) via one or more electric motors of the vehicle. Alternatively, if torque shaping module 416 determines that the vehicle torque request is greater than a current regenerative torque capability, the vehicle torque request may be applied with one or more mechanical wheel brakes to an extent the vehicle torque request exceeds the current regenerative torque capability. Furthermore, in some cases the vehicle torque request may be applied via both regenerative torque braking and mechanical braking, for example when the vehicle torque request exceeds the current regenerative torque capability of the vehicle battery system, but the current regenerative torque capability is greater than zero.

The torque shaping module 416 may also adjust application of vehicle torque over time, such as a time period or a window in time, to reach the vehicle torque request, e.g., by gradually increasing or decreasing magnitudes of applied positive or negative torque, to generally reduce the degree to which changes in applied torque are perceived by vehicle occupants. Additionally, torque requests may be divided between wheels and/or motors of the vehicle 100, e.g., by wheel torque distribution module 418. In another example, the process 600 may include determining a time period to reach the target acceleration described herein, where applying the level of vehicle torque may include adjusting the level of vehicle torque over the time period to reach target levels of vehicle torque for each of the one or more wheels of the vehicle over varying terrain, thereby reaching the target acceleration.

Process 600 may also implement a closed-loop control with respect to vehicle acceleration. For example, proceeding to block 620, process 600 may query whether actual acceleration of the vehicle is equal to the determined or target/desired vehicle acceleration. For example, autonomous control module 402 may compare actual acceleration of vehicle 100 to the target acceleration determined by the vehicle.

Where the actual acceleration is different from the target acceleration, process 600 may proceed to block 625, where mapping of acceleration to torque may be adjusted. For example, the autonomous control module 402 and/or the vehicle dynamics module 404 may revise mapping of a torque request from an acceleration. For example, constants associated with the determination of the target acceleration may be adjusted based upon the comparison, e.g., to increase or decrease the responsiveness of the speed control. Alternatively or in addition, mapping of acceleration to torque at the vehicle dynamics module 404 may be altered to adjust a response of the vehicle. Moreover, any responsive filtering or modification of any mathematical calculation in the path of calculating the vehicle torque and, for that matter, subsequent division of torque request to additional motor(s) or wheels of the vehicle can have a similar effect, whether in the autonomy control module 402 or the vehicle dynamics module 404. In any case, the autonomy control module 402 is "standardized" while allowing calculations to be modified to adjust performance or feel as may be desired. Process 600 may then proceed back to block 605, to again determine a target acceleration. In another example, the adjusted mapping may indicate a second level of vehicle torque based on the comparison between the actual acceleration and the target acceleration, where the second level of torque is different from the first level of vehicle torque determined at block 610 and 615. The second level of vehicle torque may be applied to one or more of the wheels of the vehicle, possibly to account for varying terrains, e.g., sand, dirt roads, rocky paths, among other possibilities.

Alternatively, if at block 620 the actual acceleration is determined to be equal to the target acceleration, no revisions to the mapping of acceleration to torque are needed, and process 600 may proceed back to block 605.

The foregoing modular approaches exemplified in process 600 and vehicle 100 generally facilitates use of systems of the vehicle 100, e.g., autonomy control module 402 of the processing circuitry 400, in a variety of different vehicles without requiring recalibration for different vehicle characteristics. The processing circuitry 400, despite not being tailored to the particular type or configuration of the vehicle into which it is installed, nevertheless responds to different conditions appropriately because of the self-adjusting characteristic of the acceleration determination (e.g., adjusting constants applied to vehicle speed terms), as well as vehicle-specific mapping of acceleration to torque provided by a distinct vehicle dynamics module.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A speed control system for controlling speed of a vehicle, the system comprising:
an autonomy control processing circuitry module of the vehicle, the autonomy control processing circuitry module configured to:
determine a target vehicle acceleration based upon at least one of a target vehicle following distance, a target vehicle following speed, or a target vehicle speed,
wherein the autonomy control processing circuitry module may be applied to more than one vehicle type; and
a vehicle dynamics processing circuitry module of the vehicle configured to:
map the determined target vehicle acceleration to a level of vehicle torque; and
output the level of vehicle torque to be applied to one or more wheels of the vehicle, wherein:
the level of vehicle torque is applied as an input to a drive unit;
the drive unit generates and applies the level of vehicle torque to the one or more wheels; and
the vehicle dynamics processing circuitry module is tailored to the vehicle type of the vehicle.

2. The system of claim 1, wherein the vehicle dynamics processing circuitry module is configured to map the determined target vehicle acceleration to the level of vehicle torque based on a vehicle speed.

3. The system of claim 2, wherein the vehicle dynamics processing circuitry module is configured to map the determined target vehicle acceleration to the level of vehicle torque by determining a plurality of constants, multiplying each of the plurality of constants by a respective vehicle speed term to determine a plurality of products, and adding the sum of the products.

4. The system of claim 3, wherein the plurality of constants are determined from at least a coast-down of the vehicle.

5. The system of claim 3, wherein the sum of the products represents a road load of the vehicle as a function of vehicle speed.

6. The system of claim 1, wherein the vehicle dynamics processing circuitry module is configured to apply the level of vehicle torque by adjusting vehicle torque over time to reach the one of the target vehicle following distance, the target vehicle following speed, or the target vehicle speed.

7. The system of claim 1, wherein the autonomy control processing circuitry module is configured to:
compare actual acceleration of the vehicle to the determined target vehicle acceleration; and
adjust the mapping based on the comparison.

8. The system of claim 1, wherein the autonomy control processing circuitry module is configured to determine the one of the target vehicle following distance, the target vehicle following speed, or the target vehicle speed based upon an input received from an operator input interface indicative of the target vehicle following distance, the target vehicle following speed, or the target vehicle speed, respectively.

9. A modular autonomy control module for use in one or more types of vehicles, wherein the modular autonomy control module is configured to:
detect one or more sensor inputs;
determine at least one of a target vehicle following distance, a target vehicle following speed, or a target vehicle speed based at least on the one or more sensor inputs;
determine a target vehicle acceleration based on the at least one of the target vehicle following distance, the target vehicle following speed, or the target vehicle speed; and
output the target vehicle acceleration to a vehicle dynamics module that is tailored to a vehicle type of a vehicle, wherein:
the vehicle dynamics module is configured to, for the vehicle type of the vehicle, convert the target vehicle acceleration to a corresponding torque request to achieve the target vehicle acceleration;
the vehicle dynamics module outputs the corresponding torque request to be applied to one or more wheels;
the corresponding torque request is applied as an input to a drive unit;
the drive unit generates and applies the corresponding torque request to the one or more wheels; and
the modular autonomy control module may be applied to more than one vehicle type.

10. A method of controlling speed of a vehicle, the method comprising:
determining a target vehicle acceleration, using an autonomy control module of the vehicle, based upon inputs to the autonomy control module including at least one of a target vehicle following distance, a target vehicle following speed, or a target vehicle speed, wherein the autonomy control module may be applied to more than one vehicle type;
mapping the determined target vehicle acceleration to a level of vehicle torque using a vehicle dynamics module of the vehicle, based upon vehicle dynamics module inputs including at least the determined target vehicle acceleration; and
applying the level of vehicle torque to one or more wheels of the vehicle, wherein:
the level of vehicle torque is applied as an input to a drive unit;
the drive unit generates and applies the level of vehicle torque to the one or more wheels; and
the vehicle dynamics module is tailored to the vehicle type of the vehicle.

11. The method of claim 10, further comprising:
determining one or more speeds of the vehicle, wherein the determined target vehicle acceleration is mapped to the level of vehicle torque based on the one or more determined speeds of the vehicle.

12. The method of claim 11, wherein mapping the determined target vehicle acceleration to the level of vehicle torque includes:
determining a plurality of constants;
multiplying each of the plurality of constants by a respective vehicle speed term to determine a plurality of products; and
adding the sum of the products.

13. The method of claim 12, wherein the plurality of constants are determined from at least a coast-down of the vehicle, and wherein the sum of the products represents a road load of the vehicle as a function of vehicle speed.

14. The method of claim 10, further comprising:
determining, using the autonomy control module, at least one of the target vehicle speed or a target vehicle direction; and
autonomously implementing, using the autonomy control module, at least one of a vehicle speed change or a vehicle direction change.

15. The method of claim 10, further comprising:
determining a time period to reach the determined target vehicle acceleration, and wherein applying the level of vehicle torque comprises adjusting the level of vehicle torque over the time period to reach target levels of vehicle torque for each of the one or more wheels of the vehicle.

16. The method of claim 10, further comprising:
comparing actual acceleration of the vehicle to the determined target vehicle acceleration; and
adjusting the mapping based on the comparison, wherein the adjusted mapping indicates a second level of vehicle torque based at least on the comparison with the actual acceleration and the determined target vehicle acceleration; and
applying the second level of vehicle torque to the one or more wheels of the vehicle.

17. The method of claim 10, further comprising:
determining the level of vehicle torque is a braking torque comprising a current regenerative torque for a battery system of the vehicle; and
in response to determining the level of vehicle torque is less than the current regenerative torque, applying the level of vehicle torque with the current regenerative torque via one or more electric motors of the vehicle, wherein each of the one or more electric motors independently control the one or more wheels of the vehicle.

18. The method of claim 10, further comprising:
determining the level of vehicle torque is a braking torque that is greater than a current regenerative torque for a battery system of the vehicle; and
in response to determining the level of vehicle torque is greater than a current regenerative torque capability, applying the level of vehicle torque with one or more mechanical wheel brakes to an extent the level of vehicle torque exceeds the current regenerative torque.

19. The method of claim 10, wherein applying the level of vehicle torque to the one or more wheels of the vehicle includes applying regenerative torque braking and mechanical braking when the level of vehicle torque exceeds a current regenerative torque of a vehicle battery system.

* * * * *